(12) United States Patent
Katayama et al.

(10) Patent No.: US 9,300,436 B2
(45) Date of Patent: Mar. 29, 2016

(54) SIGNAL COMPENSATION IN HIGH-SPEED COMMUNICATION

(71) Applicant: International Business Machines Corporation, Armonk, NY (US)

(72) Inventors: Yasunao Katayama, Tokyo (JP); Yasuteru Kohda, Yamato (JP); Daiju Nakano, Sagamihara (JP); Kohji Takano, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/538,004

(22) Filed: Nov. 11, 2014

(65) Prior Publication Data
US 2015/0163015 A1 Jun. 11, 2015

(30) Foreign Application Priority Data

Dec. 11, 2013 (JP) .................................. 2013-256345

(51) Int. Cl.
*H04L 1/00* (2006.01)
*H04L 25/03* (2006.01)

(52) U.S. Cl.
CPC ........ *H04L 1/0054* (2013.01); *H04L 25/03057* (2013.01); *H04L 2025/0342* (2013.01); *H04L 2025/03617* (2013.01)

(58) Field of Classification Search
CPC .................. H04L 25/03012; H04L 25/03019; H04L 27/3872; H04L 1/0054; H04L 25/03057; H04L 2025/0342; H04L 2025/03617; H03H 21/0012
See application file for complete search history.

(56) References Cited

U.S. PATENT DOCUMENTS

| 5,386,239 A * | 1/1995 | Wang .................... H04N 7/015 348/470 |
| 6,240,133 B1 * | 5/2001 | Sommer ............ H03H 21/0012 333/28 R |
| 7,471,904 B2 * | 12/2008 | Kaneda ................ H04B 10/695 398/208 |
| 2007/0230641 A1 * | 10/2007 | Yehudai .................. H04L 27/38 375/350 |

FOREIGN PATENT DOCUMENTS

| JP | 09275426 A | 10/1997 |
| JP | 2002280941 A | 9/2002 |
| JP | 2009147522 A | 7/2009 |
| JP | 2010119070 A | 5/2010 |

OTHER PUBLICATIONS

JP Application 2013-256345, entitled "Reception Apparatus, Communication System, Circuit Device, Communication Method, and Program Product (Signal Compensation in High-Speed Communication)", Filed Dec. 11, 2013.

* cited by examiner

*Primary Examiner* — Sophia Vlahos
(74) *Attorney, Agent, or Firm* — Jeff Tang; Laura E. Gisler

(57) ABSTRACT

A receptor of wireless signal in a wireless communication system can be configured to correct for degradations of signal quality. The reception apparatus can include a filter which is configured to create a filtered signal by make corrections to a reception signal which carries a symbol. Based on the created filtered signal, a symbol can be decided and weighted to evaluate the error of the original reception signal. Using the weighting information, a parameter of the filter can be updated to more accurately correct the reception signal.

10 Claims, 12 Drawing Sheets

(A)

(B)

(C)

US 9,300,436 B2

SIGNAL COMPENSATION IN HIGH-SPEED COMMUNICATION

CROSS REFERENCE TO RELATED APPLICATION

This application claims priority to Japanese Patent Application No. 2013-256345, filed Dec. 11, 2013, which is incorporated herein in its entirety.

BACKGROUND

The present disclosure relates to a reception apparatus configured to receive a signal carrying a symbol sequence from a transmission apparatus and perform compensation on the signal.

Higher-speed wireless communication can be useful for realizing real-time transmission and reception of rich content such as moving images and seamless connection to wired communication. Wideband wireless communication technologies which use a carrier of a millimeter waveband may be used with high-speed wireless communication of a data rate over the Gbps range in order to realize such high-speed large-capacity data communication.

SUMMARY

Embodiments of the present disclosure are directed toward a reception apparatus, the apparatus including a filter unit configured to create a filtered signal by correcting a reception signal that carries a symbol sequence, a decision unit configured to decide a symbol based on the filtered signal, a weighting unit configured to weight an error evaluation in accordance with a position of a signal point of the symbol decided by the decision unit, and an updating unit configured to update a correction parameter of the filter unit based on the reception signal and the error evaluation weighted by the weighting unit.

Further, according to the present disclosure, a circuit device includes an input unit configured to receive a reception signal carrying a symbol sequence, a filter unit configured to create a filtered signal by correcting the reception signal, a decision unit configured to decide a symbol based on the filtered signal, a weighting unit configured to weight an error evaluation in accordance with a position of a signal point of the symbol decided by the decision unit, an updating unit configured to update a correction parameter of the filter unit, based on the reception signal and the error evaluation weighted by the weighting unit, and an output unit configured to output a symbol sequence decided based on the filtered signal.

Embodiments of the present disclosure are directed toward a communication method executed by a reception apparatus that communicates with a transmission apparatus. The communication method including the steps executed by the reception apparatus of receiving a reception signal carrying a symbol sequence from the transmission apparatus, inputting the reception signal to a filter unit to create a filtered signal, deciding a symbol based on the filtered signal, weighting an error evaluation in accordance with a position of a signal point of the decided symbol, and updating a correction parameter of the filter unit based on the reception signal and the error evaluation that was weighted.

Certain embodiments of the present disclosure are directed toward a communication system. The communication system may be comprised of: a transmission apparatus and a reception apparatus. The reception apparatus can include: a reception unit configured to receive a reception signal that carries a symbol sequence from the transmission apparatus, a filter unit configured to create a filtered signal by correcting the reception signal, a decision unit configured to decide a symbol based on the filtered signal, a weighting unit configured to weight an error evaluation in accordance with a position of a signal point of the symbol decided by the decision unit, and an updating unit configured to update a correction parameter of the filter unit, based on the reception signal and the error evaluation weighted by the weighting unit.

Certain embodiments of the present disclosure are directed toward a program product causing a programmable device to function as: a filter unit configured to create a filtered signal by correcting a reception signal that carries a symbol sequence, a decision unit configured to decide a symbol based on the filtered signal, a weighting unit configured to weight an error evaluation in accordance with a position of a signal point of the symbol decided by the decision unit, and an updating unit configured to update a correction parameter of the filter unit, based on the reception signal and the error evaluation weighted by the weighting unit.

The above summary is not intended to describe each illustrated embodiment or every implementation of the present disclosure.

BRIEF DESCRIPTION OF THE SEVERAL VIEWS OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
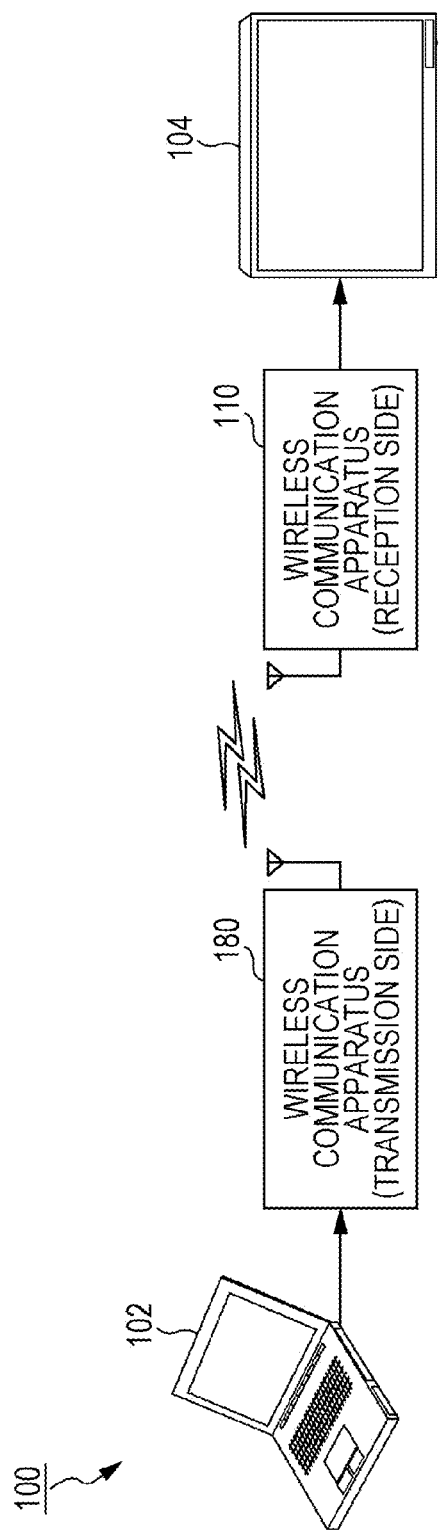
FIG. 1 is a schematic diagram illustrating a wireless communication system according to embodiments of the present disclosure.

While the disclosure is amenable to various modifications and alternative forms, specifics thereof have been shown by way of example in the drawings and will be described in detail. It should be understood, however, that the intention is not to limit the disclosure to the particular embodiments described. On the contrary, the intention is to cover all modifications, equivalents, and alternatives falling within the spirit and scope of the disclosure.

DETAILED DESCRIPTION

Aspects of the present disclosure relate to a system configured to receive a signal carrying a symbol sequence from a transmission apparatus, more particular aspects relate to a system, method, and device to perform compensation on the signal. While the present disclosure is not necessarily limited to such applications, various aspects of the disclosure may be appreciated through a discussion of various examples using this context.

Higher-speed wireless communication can be useful for realizing real-time transmission and reception of rich content such as moving images and seamless connection to wired communication. Wideband wireless communication technologies which use a carrier of a millimeter waveband can be used with high-speed wireless communication of a data rate over the Gbps range in order to realize such high-speed large-capacity data communication.

IEEE (The Institute of Electrical and Electronics Engineers, Inc.) 802.15.3c, IEEE 802.11ad, and the like are defined as standards of communication in the millimeter waveband. In these standards, single-carrier transmission is defined as a common modulation/coding scheme. Single-carrier transmission requires demodulation/decoding in the time domain, and thus a feedback filter. A scheme for performing demodulation/decoding in the frequency domain exists; however, such a scheme has drawbacks in terms of the amount of circuit, latency, and coding overhead.

There can be several factors that degrade signal quality in wireless communication. As for millimeter waves, phase noise and a direct-current (DC) offset due to a high carrier frequency and a wide bandwidth are major factors. Such phase noise and DC offset cause pronounced characteristic degradations, particularly in the case of performing amplitude multiplexing modulation, and the degradations become more pronounced as the number of levels increases.

A known pattern called a pilot word or training sequence can be embedded in a frame. Phase noise and a DC offset can be estimated in order to compensate for the phase noise and the DC offset. Techniques for performing compensation using an adaptive filter can also be used.

For example, a technique for determining a channel estimate value from a reception signal using a pilot signal known to the transmission and reception sides, estimating phase noise caused in a local oscillator, and removing the estimated phase noise before equalization is performed in the frequency domain has been disclosed. Also disclosed is a configuration in which an adaptive equalizer of decision feedback type is introduced in the time domain subsequent to equalization in the frequency domain and tap coefficients of the adaptive equalizer are adaptively controlled using a recursive least squares method. Also disclosed is a configuration in which an adaptive equalizer of transversal filter type calculates tap coefficients using the CMA (Constant Modulus Algorithm) and the algorithm used to calculate the tap coefficients is switched from the CMA to the minimum mean square error (MMSE) algorithm in order to improve performance of equalization of a reception signal waveform based on a multi-level QAM modulation scheme without requiring a specific reference signal sequence.

In the aforementioned technique for embedding a known pattern in a frame, the overhead is caused due to insertion of the known pattern, and consequently data transmission efficiency decreases. It can be desirable to reduce this overhead. In techniques using adaptive filters, a feedback circuit causes a delay without exception. It can be desirable to reduce this delay. Adaptive filters of can reach a local minimum specific to an error evaluation function and might not adaptively reach the minimum value when a modulation scheme such as QAM is used. Processing in units of blocks for the purpose of statistical processing can also be a factor causing a delay. It is also difficult to sufficiently compensate for the DC offset with ordinary linear filters.

Aspects of the present disclosure provide a reception apparatus capable of preferably compensating for phase noise contained a reception signal and of reducing a known pattern, which is inserted into a payload and causes the overhead, in high-speed communication.

Various aspects the present disclosure provide a communication system including a reception apparatus capable of preferably compensating for phase noise contained in a reception signal and of reducing a known pattern, which is inserted into a payload and causes the overhead, in high-speed communication, a circuit device included in the reception apparatus, a communication method executed by the reception apparatus, and a program product for implementing the reception apparatus.

According to embodiments, phase noise contained in a reception signal is preferably compensated for and a known pattern that is inserted into a payload and can cause the overhead to be reduced in high-speed communication.

The present disclosure will be described below using a specific embodiment; however, the present disclosure is not limited to embodiments described below. Note that in an embodiment described below, a description will be given using a wireless communication apparatus 110 as an example of a reception apparatus, and using a wireless communication system 100 including the wireless communication apparatus 110 as an example of a wireless communication system including the reception apparatus.

FIG. 1 is a schematic diagram of the wireless communication system 100 according to an embodiment of the present disclosure. The wireless communication system 100 according to the embodiment includes wireless communication apparatuses 110 and 180. The wireless communication apparatuses 110 and 180 can establish wireless communication based on a single-carrier scheme and a coherent detection scheme by using, for example, an electromagnetic wave (millimeter wave) of a several-tens-GHz frequency band, and enable a data communication speed of several Gbps or higher. Note that each of the wireless communication apparatuses 110 and 180 can act as both a receiver and a transmitter to perform data communication with its partner; however, the following description will be given on the assumption that the wireless communication apparatus 110 is a reception side and the wireless communication apparatus 180 is a transmission side for convenience of explanation.

A wireless communication apparatus 180 maps transmission data to a frame, and transmits the data to a wireless communication apparatus 110 serving as its communication partner. In an example illustrated in FIG. 1, a notebook personal computer 102 can be connected to the wireless communication apparatus 180, and a display device 104 can be connected to the wireless communication apparatus 110. According to embodiments, the wireless communication apparatus 180 can map content data, such as moving images, input from the notebook personal computer 102 to a frame, and transmit the content data to the wireless communication apparatus 110. The display device 104 receives the content data via the wireless communication apparatus 110, and displays content on its screen.

Figure 2:
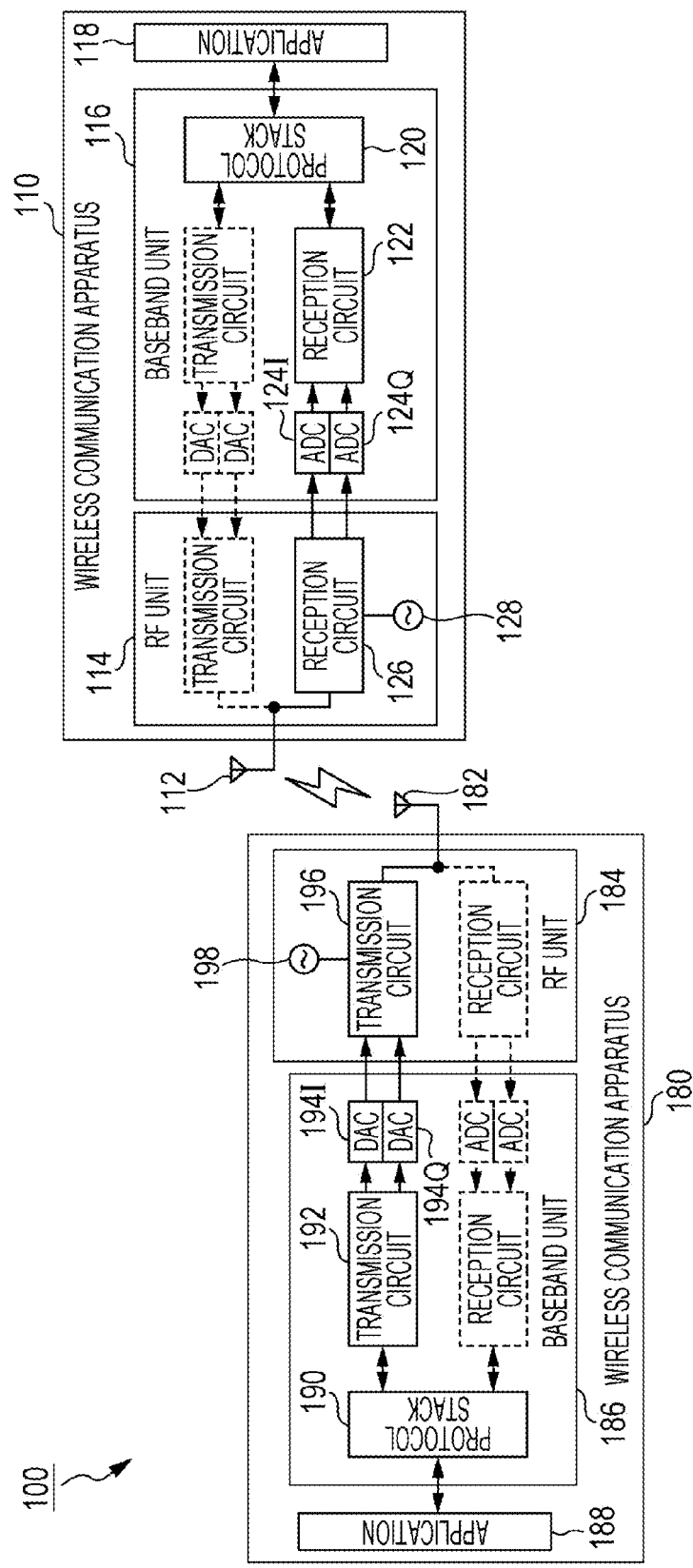
FIG. 2 is a block diagram illustrating the overall configurations of wireless communication apparatuses in the wireless communication system according to embodiments of the present disclosure.

FIG. 2 depicts a block diagram illustrating the overall configurations of the wireless communication apparatuses 110 and 180 in the wireless communication system 200, according to the embodiment of the present disclosure. A wireless communication apparatus 110 as illustrated in FIG. 2 can include an antenna 112, an RF (Radio Frequency) unit 114 responsible for analog processing, a baseband unit 116 responsible for digital processing, and an application 118. Similarly, a wireless communication apparatus 180 includes an antenna 182, an RF unit 184, a baseband unit 186, and an application 188.

Note that in FIG. 2, components on a reception path are assigned reference numerals and components not on the reception path are not assigned reference numerals and are illustrated with dotted lines in the wireless communication apparatus 110. Similarly, components not on a transmission path are not assigned reference numerals and are illustrated with dotted lines in the wireless communication apparatus 180 on the contrary to the reception side.

During transmission, an antenna 182 converts an electric signal input from the RF unit 184 into an electromagnetic wave, and radiates the electromagnetic wave to the air. During reception, the antenna 112 receives a propagating electromagnetic wave, converts the electromagnetic wave into an electric signal, and can input the electric signal to the RF unit 114.

The RF units 114 and 184 are circuit blocks which can each be configured to process a signal of a radio frequency (RF) band on an electromagnetic wave serving as a carrier. The RF units 114 and 184 can include a reception circuit 126 and a transmission circuit 196, respectively. Local oscillators 128 and 198 each including a PLL (Phase Locked Loop) synthesizer or the like are connected to the reception circuit 126 and the transmission circuit 196, respectively. Based on a carrier signal generated by the local oscillator 198, the transmission circuit 196 modulates an input baseband signal into a signal of RF band. Based on a carrier signal reproduced by the local oscillator 128, the reception circuit 126 demodulates an input signal of RF band into a baseband signal.

The baseband units 116 and 186 are circuit blocks respectively configured to process a demodulated baseband signal and an unmodulated baseband signal. During transmission, the baseband unit 186 can generate a transmission baseband signal based on transmission data (bit sequence) input from the application 188, and outputs the transmission baseband signal to the RF unit 184. During reception, the baseband unit 116 restores reception data (bit sequence) on the basis of a reception baseband signal demodulated by the RF unit 114, and can output the reception data to the application 118.

More specifically, the baseband unit 116 includes a protocol stack 120, a reception circuit 122, and ADCs (Analog to Digital Converters) 124, whereas the baseband unit 186 includes a protocol stack 190, a transmission circuit 192, and DACs (Digital to Analog Converters) 194. The protocol stacks 120 and 190 are responsible for processing of a layered communication protocol suite including the physical layer, the data link layer, the network layer, and the transport layer, etc.

The transmission circuit 192 modulates transmission data input from the protocol stack 190 in accordance with an adopted modulation scheme to generate a transmission baseband signal, and outputs the transmission baseband signal to the transmission circuit 196 of the RF unit 184 via the DACs 194. The reception circuit 122 receives a reception baseband signal demodulated by the reception circuit 126 of the RF unit 114 via the ADCs 124, restores reception data in accordance with the modulation scheme, and outputs the reception data to the protocol stack 120.

The embodiment to be described adopts, but not limited to, a quadrature amplitude modulation (QAM) scheme. Data is transmitted by modulating the amplitudes and phases of two carriers. These two carriers, namely, an in-phase (I) carrier and a quadrature (Q) carrier, have a quadrature relationship in terms of phase, and are independent from each other. Because the aforementioned modulation scheme is adopted, the baseband signal includes an I-component and a Q-component in this embodiment. These I-component and Q-component form a symbol sequence of transmission data. A signal point representing a symbol is specified on a constellation diagram by the signal levels of these signals at a time point.

Note that the modulation scheme to be adopted, codes assigned to symbols, and so on can be predetermined in the wireless communication system 100. Also, in embodiments, 16QAM is described as an example of a preferably employable modulation scheme; however, in some embodiments, a scheme such as other MQAM (M-ary QAM) such as 64QAM or MPSK (M-ary Phase Shift Keying) can be suitably adopted besides 16QAM.

As described above, the wireless communication apparatuses 110 and 180 can perform wireless communication based on a single-carrier transmission scheme and a coherent detection scheme. Phase noise may be caused in the above-described local oscillators 128 and 198 at the reception circuit 126 side and the transmission circuit 196 side, respectively. On the transmission side, preprocessing for randomizing bits of transmission data can be performed using a scrambler or the like in advance. A data-dependent DC offset may be caused by signal bias that possibly occurs. These factors can worsen the demodulation and decoding error rate at the receiver side. Also, as the data rate becomes higher, the influence of the aforementioned phase noise and DC offset becomes more pronounced.

Accordingly, in the wireless communication system 100 according to embodiments of the present disclosure, the fact that the likelihood of erroneous decision due to phase noise differs depending on the position of the signal point of the symbol (corresponding symbol decision region) on the constellation diagram is focused on and weighted evaluation is performed on errors used to update parameters, in accordance with the position of the signal point of the decided symbol, in an update logic of an adaptive equalizer that equalizes the baseband signal at the reception side.

In the wireless communication system 100 according to embodiments, a compensator that compensates for phase noise, a DC offset, or both of them can be provided outside the update loop of the adaptive equalizer. By providing a compensator outside the update loop, a processing delay of the compensator is separated from a feedback delay of the adaptive equalizer and the response performance of phase noise compensation of the adaptive equalizer is improved and high-frequency phase noise that is not sufficiently followed by the adaptive equalizer is compensated for by the compensator at the subsequent stage. Details about signal processing executed by the wireless communication apparatus 110 at the reception side will be described below with reference to FIGS. 3 to 10.

Figure 3:
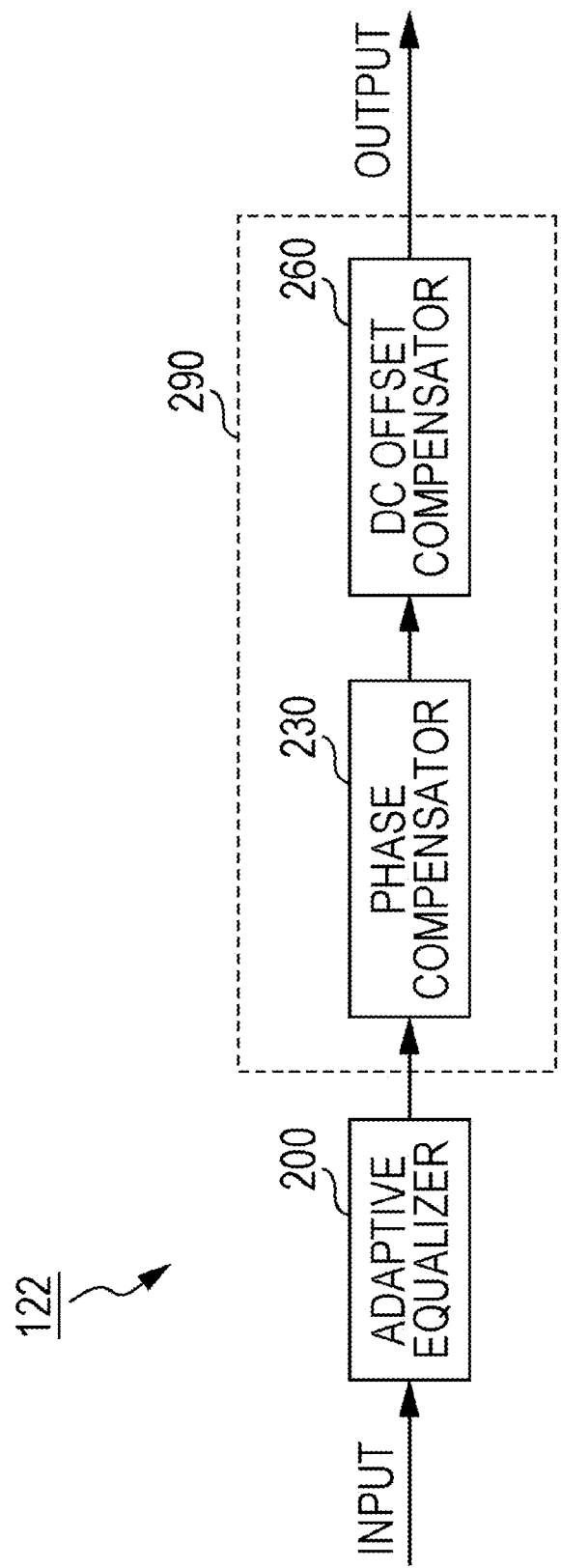
FIG. 3 is a block diagram of a compensation circuit of a reception circuit of a reception-side baseband unit according to embodiments of the present disclosure.

FIG. 3 illustrates a block diagram of a compensation circuit included in the reception circuit 122 of the reception-side baseband unit 116 according to embodiments of the present disclosure. Note that FIG. 3 illustrates major components related to phase compensation and offset compensation according to the embodiment and illustration of other peripheral components is omitted. Also, the baseband signal forms a symbol sequence from the I-component and the Q-component as described above; however, a complex-valued symbol is used in FIG. 3 and the subsequent figures so as to collectively handle the I-component and the Q-component of the reception baseband signal.

As illustrated in FIG. 3, the reception circuit 122 of the reception-side baseband unit 116 includes an adaptive equalizer 200, a phase compensator 230, and a DC offset compensator 260 which serve as a compensation circuit; and enables equalization, compensation for the phase noise, and compensation for the DC offset in the digital domain.

A reception baseband signal sampled by the ADCs 124I and 124Q, as illustrated in FIG. 2, can be input to the adaptive equalizer 200. The adaptive equalizer 200 receives the input baseband signal while updating correction parameters in accordance with a predetermined adaptive algorithm, and outputs the corrected baseband signal to a compensator 290 at the subsequent stage.

The compensator 290 according to this embodiment includes the phase compensator 230 and the DC offset compensator 260. The phase compensator 230 is provided subsequent to the adaptive equalizer 200. The phase compensator 230 receives the input baseband signal corrected by the adaptive equalizer 200, performs phase compensation on the baseband signal, and outputs the phase-compensated baseband signal to the subsequent stage. In embodiments, as illustrated in FIG. 3, the DC offset compensator 260 can be connected to the phase compensator 230 in series. The DC offset compensator 260 receives the input baseband signal phase-compensated by the phase compensator 230, performs DC offset compensation on the baseband signal, and outputs the DC-offset-compensated baseband signal to the subsequent stage. Thereafter, symbol decision can be performed based on the compensated baseband signal, and reception data is restored.

In some embodiments, the compensator 290 is provided outside an update loop of the adaptive equalizer 200. The adaptive equalizer 200 is responsible for compensation for relatively-slow phase noise components, whereas the phase compensator 230 and the DC offset compensator 260 are responsible for compensation for high-frequency phase noise components that are not sufficiently followed by the adaptive equalizer 200 and compensation for DC offset components.

Figure 4:
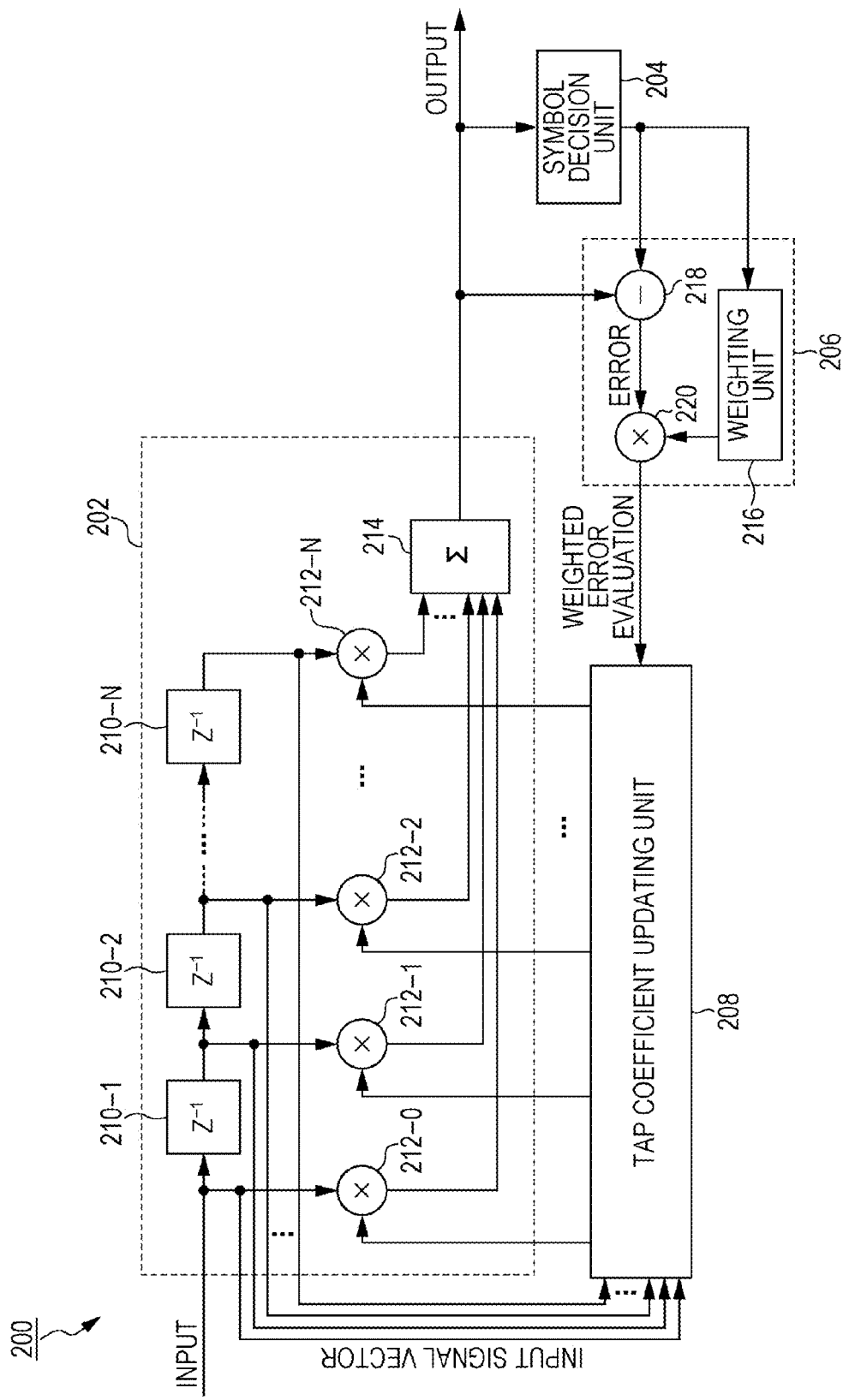
FIG. 4 is a block diagram of an adaptive equalizer according to embodiments of the present disclosure.

The adaptive equalizer 200 according to embodiments of the present disclosure will be described in more detail below with reference to FIGS. 4 to 7. FIG. 4 illustrates a block diagram of the adaptive equalizer 200 according to the embodiment of the present disclosure. The adaptive equalizer 200 illustrated in FIG. 4 includes a variable filter unit 202, a symbol decision unit 204, an error weighted-evaluation unit 206, and a tap coefficient updating unit 208. Note that FIG. 4 illustrates a decision-directed adaptive equalizer that does not use a training sequence.

Based on set correction parameters, a variable filter unit 202 equalizes the input reception baseband signal in the time domain, and outputs the resulting baseband signal to the subsequent stage. More specifically, a variable filter unit 202 can include N delay blocks 210-1 to 210-N each delay the input baseband signal by one sampling period, N+1 multipliers 212-0 to 212-N each multiply a sampled value by a coefficient, and an adder 214 that adds the multiplication results together; and is configured as a tapped delay line. Correction parameters of the variable filter unit 202 are tap coefficients multiplied by the multipliers 212.

Note that it is assumed in embodiments described, a baseband signal sampled at symbol intervals (symbol-spaced baseband signal) is input and a weighted sum of values of delay lines is output every symbol period; however, the configuration is not limited to the specific configuration of the equalizer. In some embodiments, the equalizer may be configured so that a baseband signal oversampled at a rate of a multiple of an integer or fraction is input, and q (q is a positive integer) input samples are received before p (p is a positive integer) output samples are generated.

The symbol decision unit 204 can decide a symbol from the baseband signal that has passed through the variable filter unit 20 and has been corrected. The symbol decision is performed by deciding a symbol decision region in which the signal point is located. The symbol decision regions are defined by decision boundaries of the I-component and the Q-component on the complex plane. From the symbol decision result, an error (error vector) can be determined as a difference between a position of a signal point at which the symbol of the corrected baseband signal is measured and a position of an ideal signal point based on the symbol decision value.

The error weighted-evaluation unit 206 performs weighted evaluation on the determined error in accordance with the position of the signal point of the decided symbol on the constellation diagram, and outputs the evaluation result to the tap coefficient updating unit 208. More specifically, the error weighted-evaluation unit 206 can include a subtractor 218 that calculates an error vector between the signal point of the corrected signal output from the variable filter unit 202 and the ideal signal point of the symbol decided based on the corrected signal, a weighting unit 216 that determines a weight value used for evaluation, and a multiplier 220 that multiples the error vector by the weight value determined by the weighting unit 216. The weighting unit 216 determines a weight value used for evaluation of the error, in accordance with the symbol decision region corresponding to the position of the signal point of the symbol decided by the symbol decision unit 204.

The weighting unit 216 weights the evaluation by setting weight values corresponding to margins of errors of phase rotation (or can be referred to as tolerance against phase noise) for individual symbol decision regions in the constellation diagram.

More specifically, a smaller weight value is set for a symbol decision region which has a smaller margin of error and in which erroneous decision is more likely to occur because of phase noise, that is, phase rotation. This is because a decided symbol is not necessarily correct in the case of the decision-directed configuration. When a signal point of a symbol is located in an adjacent symbol decision region on the complex plane because of phase rotation, an incorrect symbol is decided, and consequently an incorrect error vector is calculated. Accordingly, a larger evaluation weight is set for a more reliable error vector with a relatively low probability of erroneous decision, and a smaller evaluation weight is set for an error vector with a relatively high probability of erroneous decision.

The input signal vector including values from the individual delay lines as its elements can be input to the tap coefficient updating unit 208. Also, the weighted evaluation of the error (error vector×weight value) is input to the tap coefficient updating unit 208 from the error weighted-evaluation unit 206. Based on the input signal vector and the weighted evaluation of the error, the tap coefficient updating unit 208 updates individual tap coefficients of the variable filter unit 202 using an adaptive algorithm.

The adaptive algorithm can be, but not particularly limited to, any of: a least mean squares (LMS) algorithm, a signed LMS algorithm, a normalized LMS algorithm, a variable-step-size LMS algorithm, a recursive least squares (RLS) algorithm, a constant modulus algorithm (CMA), or combinations of these algorithms.

Figure 5:
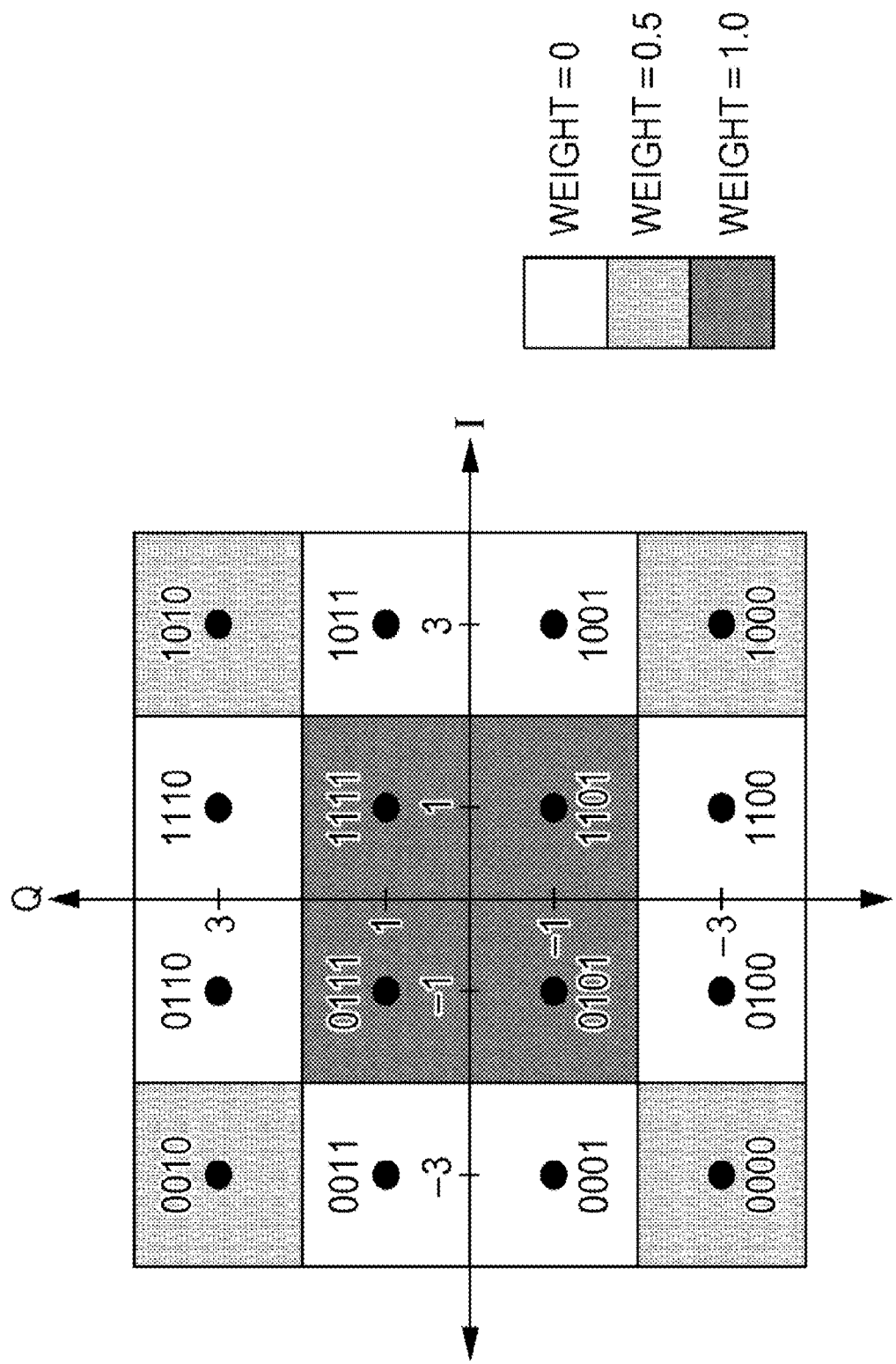
FIG. 5 is a diagram illustrating weights of symbol decision regions set based on a margin of error in terms of phase rotation in the case of 16QAM, consistent with embodiments of the present disclosure.

Details about evaluation weighting performed by the weighting unit 216 will be described below with reference to FIGS. 5 to 7. FIG. 5 is a diagram illustrating weights of individual symbol decision regions that are set based on a margin of error in terms of phase rotation in the case of 16QAM.

Weighting illustrated in FIG. 5 is performed such that a weight for outer symbol decision regions at four corners is set smaller than a weight for four inner symbol decision regions, and a weight for eight other symbol decision regions is set further smaller. This is because it is considered that errors due to phase rotation are less likely to occur in the four inner symbol decision regions on the complex plane than in the other symbol decision regions, and thus the four inner symbol decision regions have a larger margin of error; and the outer symbol decision regions at the four corners have a larger margin of error than the other outer symbol decision regions. In an example, an error evaluation weight for the four inner symbol decision regions is set to "1.0", a weight for the symbol decision regions at the four corners is set to "0.5", and a weight for the other symbol decision regions is set to "0".

Figure 6:
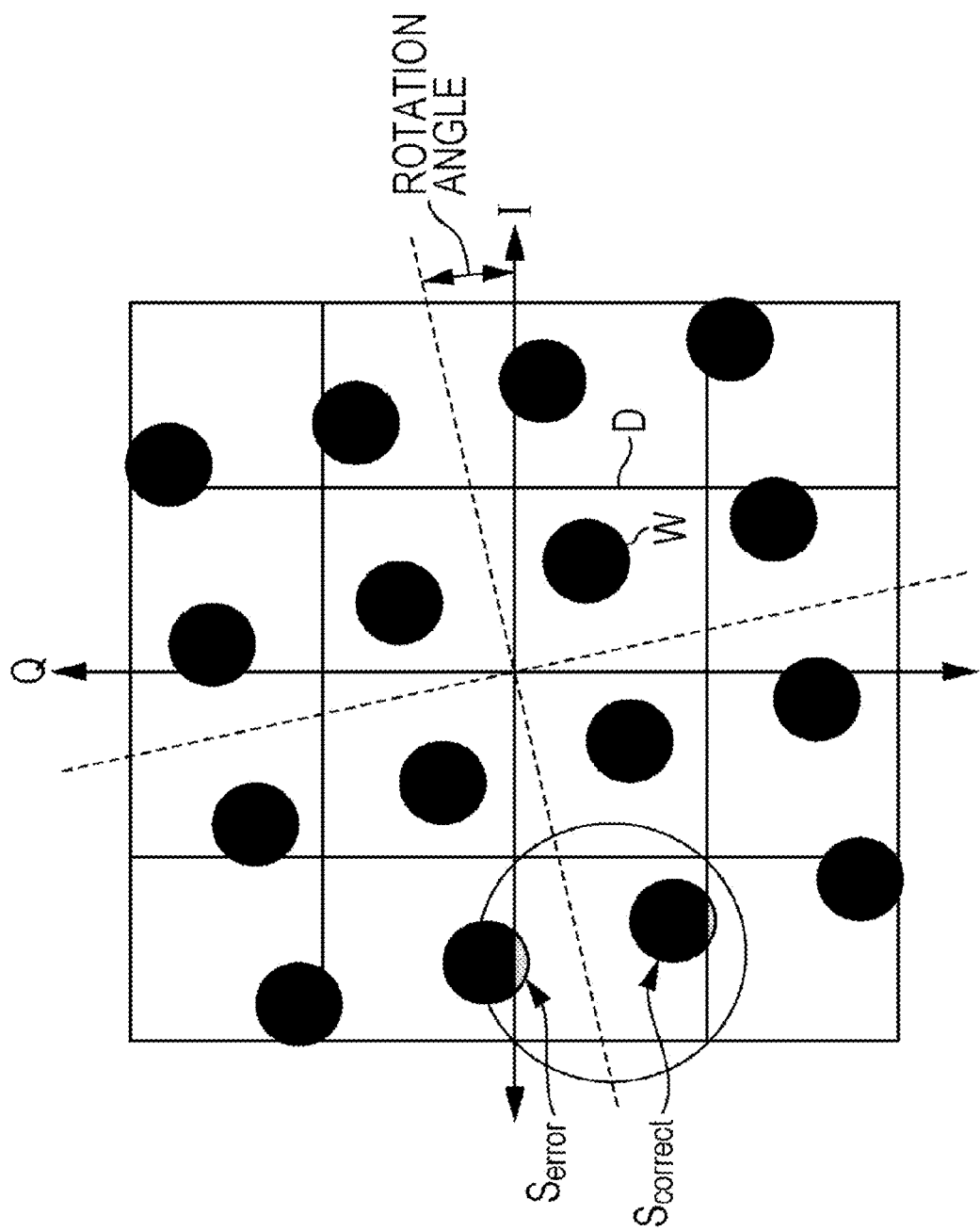
FIG. 6 is a diagram that explains a margin of error in each symbol decision region in the case of 16QAM, consistent with embodiments.
Figure 7:
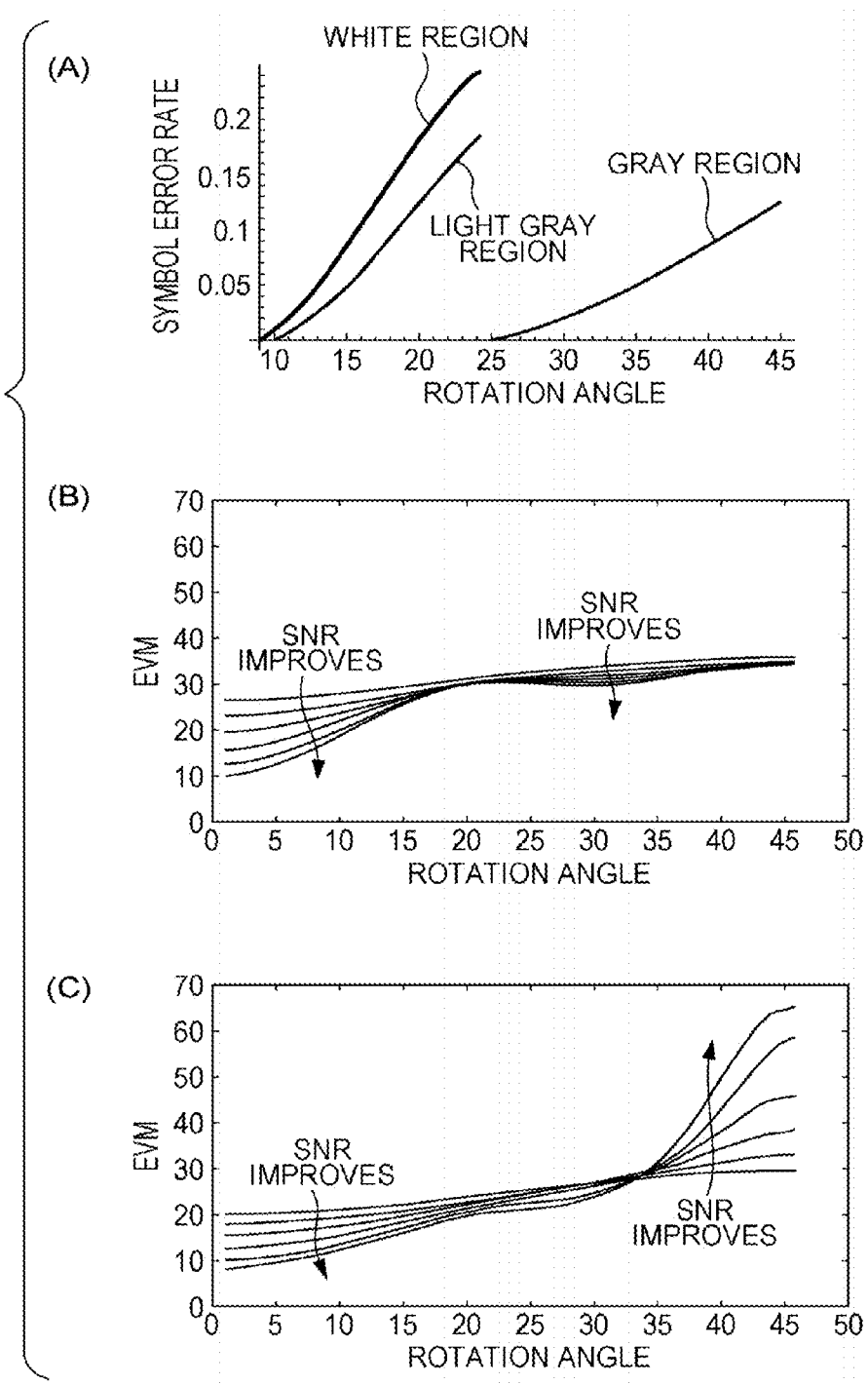
FIG. 7(A) is graph in which a symbol error rate in each symbol decision region is plotted against a rotation angle of phase rotation.
FIGS. 7(B) and 7(C) are graphs in which an error vector magnitude is plotted against a rotation angle of phase rotation from a correct signal constellation point in the case where a weight is not changed and in the case where weighting illustrated in FIG. 5 is applied, respectively.

FIG. 6 is a diagram that explains margins of error of individual symbol decision regions in the case of 16QAM, for example. As illustrated in FIG. 6, in the case of 16QAM, there are 16 symbol decision regions in the constellation diagram. In FIG. 6, a black circle represents a spread distribution of a signal point due to white noise, and a tilted arrangement of 4×4 black circles indicates that signal constellation is phase-rotated at a certain rotation angle. Because each black circle illustrated in FIG. 6 has a diameter that fits within the corresponding symbol decision region, this diagram indicates a situation in which phase noise is dominant over white noise. White noise is generally considered to have a Gaussian distribution; however, in the case of a high SNR (Signal to Noise Ratio), white noise can be considered to approximately have a uniform probability distribution of a small diameter.

A symbol error rate can be roughly calculated for each symbol decision region from a region $S_{error}$ which is protruding part of the black circle originally located in the adjacent decision region and a region $S_{correct}$ which is part of the black circle originally located in the decision region when a distribution of the signal point of a symbol represented by the black circle is phase-rotated at a certain rotation angle with respect to the origin of the complex plane.

FIG. 7(A) is a graph in which the rotation angle of phase rotation is plotted on its horizontal axis and the symbol error rate calculated for each symbol decision region is plotted on its vertical axis. As illustrated in FIG. 7(A), it is indicated that erroneous decision scarcely occurs in the four inner symbol decision regions (gray) unless the phase is rotated by approximately 25 degrees and the margin of error is highest. It is also indicated that erroneous decision occurs in the other symbol decision regions (white and light gray) at approximately 10 degrees and this significantly worsens the symbol error rate; however, the error rate of the symbol decision regions at the four corners (light gray) is relatively lower.

As described above, the weighting unit 216 assumes that a reception signal has a small spread, quantifies a margin of error by deciding a likelihood of erroneous decision due to phase rotation in each symbol decision region as the symbol error rate, and sets a larger weight for a decision region with a smaller symbol error rate and thus a larger margin of error.

Note that the aforementioned symbol error rate may be calculated on the assumption of a uniform probability distribution with a small diameter described above or of a Gaussian distribution. Alternatively, the margins of error may be compared using an angle at which the edge of a black circle representing a signal point in a decision region reaches its adjacent decision region or an angle (allowable range) at which a black circle in a decision region starts to run over to the adjacent decision region; and weighting may be performed based on the comparison. Note that the specific weight value need not be set in proportion to the symbol error rate or the margin of error.

FIGS. 7(B) and 7(C) illustrate graphs in which the error vector magnitude (EVM) in the case where phase rotation of a rotation angle has occurred with respect to the correct signal constellation in various noise environments is plotted. FIG. 7(B) illustrates the error vector magnitude calculated in the case where weights for all symbol decision regions are set to be equal instead of being different. FIG. 7(C) illustrates the error vector magnitude calculated in the case where weighting illustrated in FIG. 5 is performed. The error vector magnitude (EVM) represents a difference in magnitude of a vector between the position of the correct signal point and the measured signal point on the complex plane, and is normalized in accordance with the average reference signal power, average constellation power, peak constellation power, or the like.

When no weighting is performed, a local minimum appears at approximately 30 degrees in the case of a good SNR as illustrated in FIG. 7(B) because of the following reason. In the decision-directed configuration, if the signal point runs over the adjacent decision region owing to phase rotation, the signal point approaches the position of the adjacent ideal signal point which is incorrect, and the error is evaluated based on the incorrect signal point of the symbol and consequently the error is underestimated from its appearance. The presence of such a local minimum that is not the minimum value of the error evaluation function causes tap coefficients to be updated toward this local minimum, and implies that adaptive adjustment to the correct position may be prevented.

Also, in FIG. 7(B), the local minimum disappears in the case of a low SNR; however, an area of small gradient still remains at 20 to 45 degrees. Because the adaptive algorithm updates parameters so as to improve the evaluation function, the correct improving direction may not be decided in such an area of small gradient.

In contrast, when the above-described weighting corresponding to the symbol decision regions is performed, no local minimum appears in the case of a good SNR at approximately 20 to 45 degrees where a local minimum appears in the case where no weighting is performed, as illustrated in FIG. 7(C). Also, the slope of the evaluation function becomes larger and convergence is more likely to be achieved at the correct position of the signal constellation. This is based on the weighting configuration in which the error vector obtained in a reliable symbol decision region is evaluated using a large weight and the error vector obtained in a symbol decision region in which erroneous decision is relatively likely to occur is evaluated with a small weight.

The above-described weighting allows the adaptive equalizer 200 to adaptively converge to correct correction parameters. Note that in the case of 16QAM, signal constellation has four-fold rotational symmetry. Thus, the EVM shows a local minimum at the position that is phase-rotated from the correct position by 90 degrees. For this reason, it is preferable that weights be set so that the evaluation function that evaluates the average error using the phase rotation angle from the correct signal constellation position has a sole local minimum at the correct position within a range of 90 degrees (±45 degrees) centered at the correct position. More generally, it is preferable that weights be set so that the evaluation function has a sole local minimum at the correct position within a range of 360/n degrees centered at the correct position, where n denotes an order of rotational symmetry of signal constellation based on the modulation scheme.

By adopting the above-described weighting method, feedback with a reduced amount of error regarding phase rotation due to phase noise is performed and the evaluation function no longer has a local minimum at an incorrect position, and consequently convergence of the correction parameter to an incorrect point can be prevented. In the above-described weighting, a weight value may be given only to the four inner symbol decision regions and a weight of the other regions may be set to zero; however, this decreases the update frequency and thus it is preferable to give a weight value of some extent.

Also, in the above-described adaptive equalizer 200, convergence is more easily achieved by an update logic based on weighted evaluation of the error vector. Thus, a training sequence included in a payload (data portion subsequent to a preamble) within a frame to be transmitted and received can be reduced. However, the present disclosure does not exclude an embodiment in which a training sequence is embedded at the start part or in the middle of the data portion of a frame and the adaptive equalizer 200 is trained using the training sequence. Further, the adaptive equalizer 200 may be trained using the preamble preceding the data portion and used for timing synchronization and frequency synchronization. Furthermore, the adaptive equalizer 200, as illustrated in FIG. 4, is an example of a decision-directed symbol-spaced equalizer; however, the adaptive equalizer 200 is not limited particularly to this one and may be configured as, for example, a fractionally-spaced equalizer or an decision-feedback equalizer including a forward filter and a feedback filter, or others.

Figure 8:
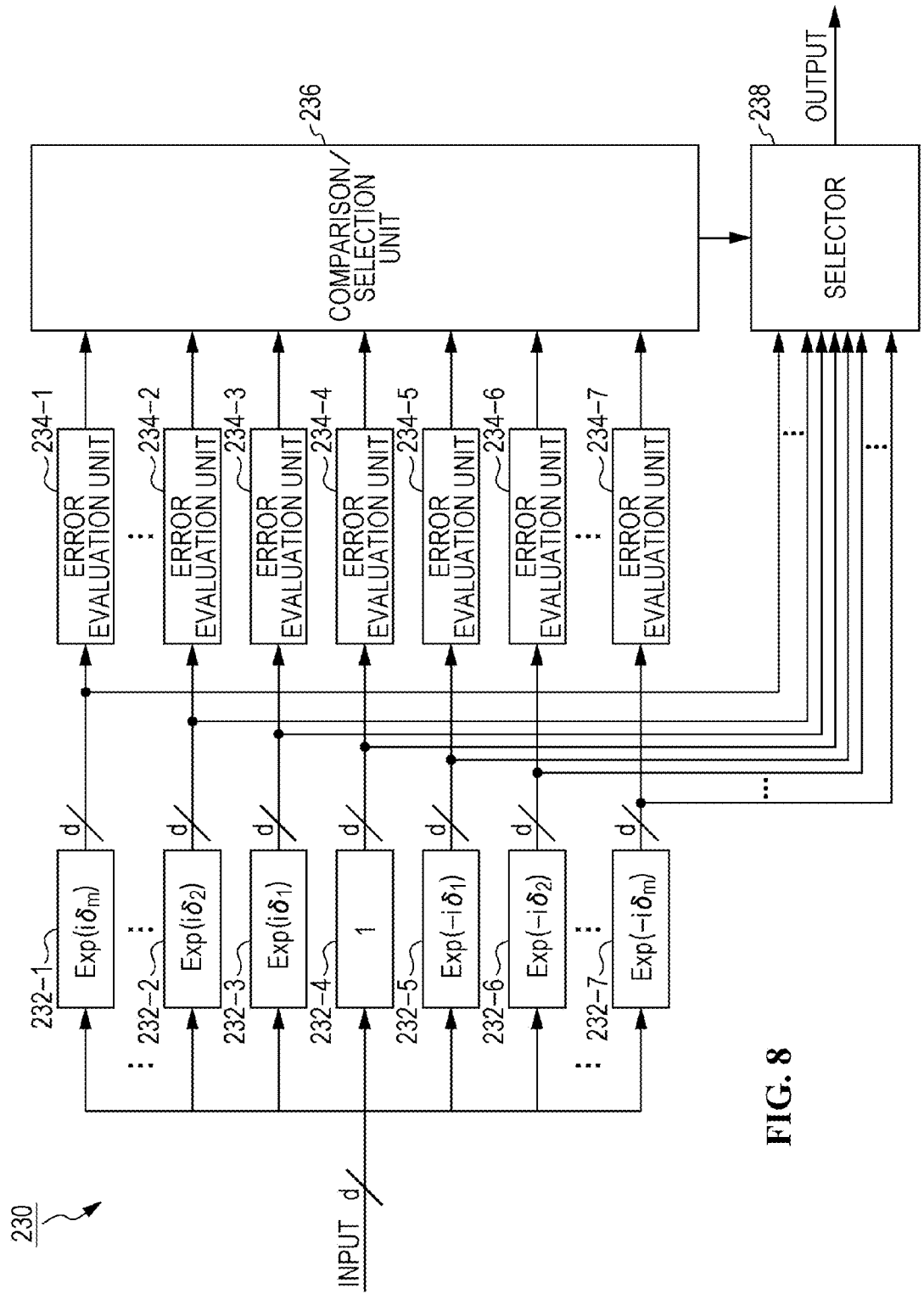
FIG. 8 is a block diagram of a phase compensator according to embodiments of the present disclosure.
Figure 9:
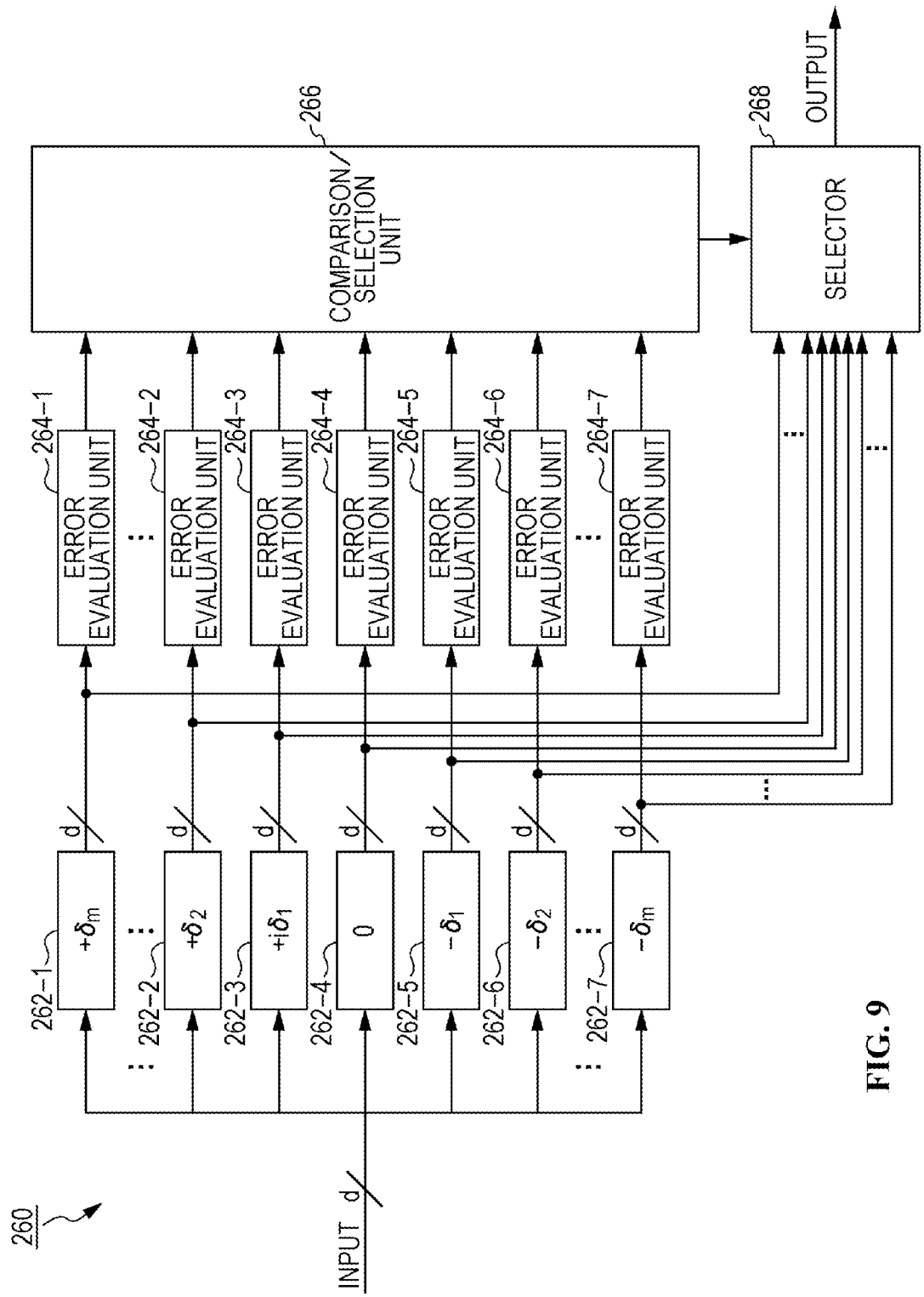
FIG. 9 depicts a block diagram of a DC offset compensator according to embodiments of the present disclosure.

Details about the compensator 290 (the phase compensator 230 and the DC offset compensator 260) provided outside the update loop in this embodiment will be described below with reference to FIGS. 8 and 9. The phase compensator 230 and the DC offset compensator 260 each attempt geometrical operations (specifically, rotation and translation) on the baseband signal that has been corrected at the preceding stage, in parallel, using a plurality of compensation parameters; selects a symbol sequence of a compensation parameter with the smallest error from among the plurality of resulting trial symbol sequences; and outputs the selected signal to the subsequent stage. FIG. 8 illustrates a block diagram of the phase compensator 230 according to the embodiment of the present disclosure. FIG. 9 illustrates a block diagram of the DC offset compensator 260 according to the embodiment of the present disclosure.

First, a phase compensator 230 will be described. As illustrated in FIG. 8, the phase compensator 230 can include a plurality of phase rotation devices 232-1 to 232-7, a plurality of error evaluation units 234-1 to 234-7 respectively provided for the phase rotation devices 232-1 to 232-7, a comparison/selection unit 236, and a selector 238.

The baseband signal of d symbols that is input to the phase compensator 230 is input to the individual phase rotation devices 232 in parallel. Here, d denotes a data width and may be an integer of 1 or larger, and d=8 indicates a width of 8 symbols and d=16 indicates a width of 16 symbols. Because the average-based evaluation is performed in the error evaluation units 234 at the subsequent stage, it is preferable to have a width of some symbols in accordance with the number of all symbols in the constellation. In the case of 16QAM, the constellation includes 16 symbols in total. Therefore, a width of 8 symbols or 16 symbols may be set.

Also in FIG. 8, rotation angle offsets $\{0, \pm i\delta_1, \pm i\delta_2, \ldots, \pm i\delta_m\}$ are respectively set for the phase rotation devices 232. The phase rotation devices 232 each multiply d input symbols by a complex number in accordance with the set offset, and obtain a signal of a symbol sequence that has been phase-rotated at a predetermined ration angle on the complex plane. Note that in the phase rotation devices 232, i denotes the imaginary unit, $\delta_j$ (where j=1, 2, . . . , m) denotes a rotation angle, and the sign denotes right rotation or left rotation. Also, the number of levels attempted is 2m+1 (including the rotation angle of 0). However, the number of levels and the step of offsets set in each level are not limited to particular ones, and may be set in accordance with an allowable circuit scale and a required phase compensation precision.

Compensation results obtained by the respective phase rotation devices 232 are input to the corresponding error evaluation units 234. The error evaluation units 234 each calculate an error evaluation value of the input compensation result (signal of trial symbol sequence). As the evaluation function for evaluating the error, for example, the error vector magnitude (EVM) can be used. In this case, the error evaluation units 234 each calculate the error vector magnitude by treating d symbols as a block. The evaluation results are input to the comparison/selection unit 236.

The comparison/selection unit 236 compares the evaluation results input from the respective error evaluation units 234 with one another, and selects a path with the smallest error vector magnitude as an output. A selection signal is input to the selector 238 from the comparison/selection unit 236. The selector 238 outputs, to the subsequent stage, a signal of a symbol sequence of the path selected from among the trial symbol sequences obtained by performing phase rotation at specific rotation angles in parallel.

Note that the evaluation function may be any of an average of error vector magnitudes of a plurality of symbols, an average of sums of absolute values of the I-components and Q-components of the error vectors, an average of phase errors each between the correct symbol position and the measured symbol position on the complex plane, an average of sums of phase errors and amplitude errors, and combinations of these values, in addition to the above-described EVM.

Subsequently, an embodiment of the DC offset compensator 260 will be described with reference to FIG. 9. The DC offset compensator 260 includes a plurality of translation devices 262-1 to 262-7, a plurality of error evaluation units 264-1 to 264-7 respectively provided for the translation devices 262-1 to 262-7, a comparison/selection unit 266, and a selector 268.

The baseband signal of d symbols that is input to the DC offset compensator 260 is input to the individual translation devices 262 in parallel. Also, in FIG. 9, translation distance offsets $\{0, \delta_1, \pm\delta_2, \ldots, +\delta_m\}$ are respectively set for the translation devices 262. Translation devices, as illustrated at 262, can each perform addition or subtraction on d input symbols using a complex number in accordance with the set offset, and obtain a signal of a symbol sequence that has been translated by a predetermined translation distance on the complex plane.

Note that in the translation devices 262, $\delta_j$ denotes a real number in the case of a translation device for the I-component, and $\delta_j$ denotes an imaginary number in the case of a translation device for the Q-component. Also, the number of levels attempted is 2m+1. However, the number of levels and the step of offsets set in each level are not limited to particular ones, and may be set in accordance with an allowable circuit scale and a required DC offset compensation precision.

Compensation results obtained by the respective translation devices 262 are input to the corresponding error evaluation units 264. The error evaluation units 264 each calculate an error evaluation value of the input DC offset compensation result (signal of trial symbol sequence). Just like the phase compensator 230, any of the error vector magnitude (EVM), an average of error vector magnitudes of a plurality of symbols, an average of sums of absolute values of the I-components and Q-components of the error vectors, an average of phase errors each between the correct symbol position and the measured symbol position on the complex plane, an average of sums of phase errors and amplitude errors, and combinations of these values can be used as the error evaluation function.

The comparison/selection unit 266 compares the evaluation results input from the respective error evaluation units 264 with one another, and selects a path with the smallest error evaluation value as an output. A selection signal is input to the selector 268 from the comparison/selection unit 266. The selector 268 outputs, to the subsequent stage, a signal of a symbol sequence of the path selected from among the trial symbol sequences obtained by performing translation over specific translation distances in parallel.

In the described embodiment, from the viewpoint of the circuit scale, the I-component (real component) and the Q-component (imaginary component) are connected to in series to the DC offset compensator 260 of 2m+1 levels, and where DC offset compensation is performed independently for each component. However, in some embodiments, $\delta_j$ may be a complex number, and an attempt of a predetermined number of levels (for example, 3 levels for each components, that is, 9 levels) can be performed collectively on the I-component and the Q-component, and a path with the smallest error may be selected.

Figure 10:
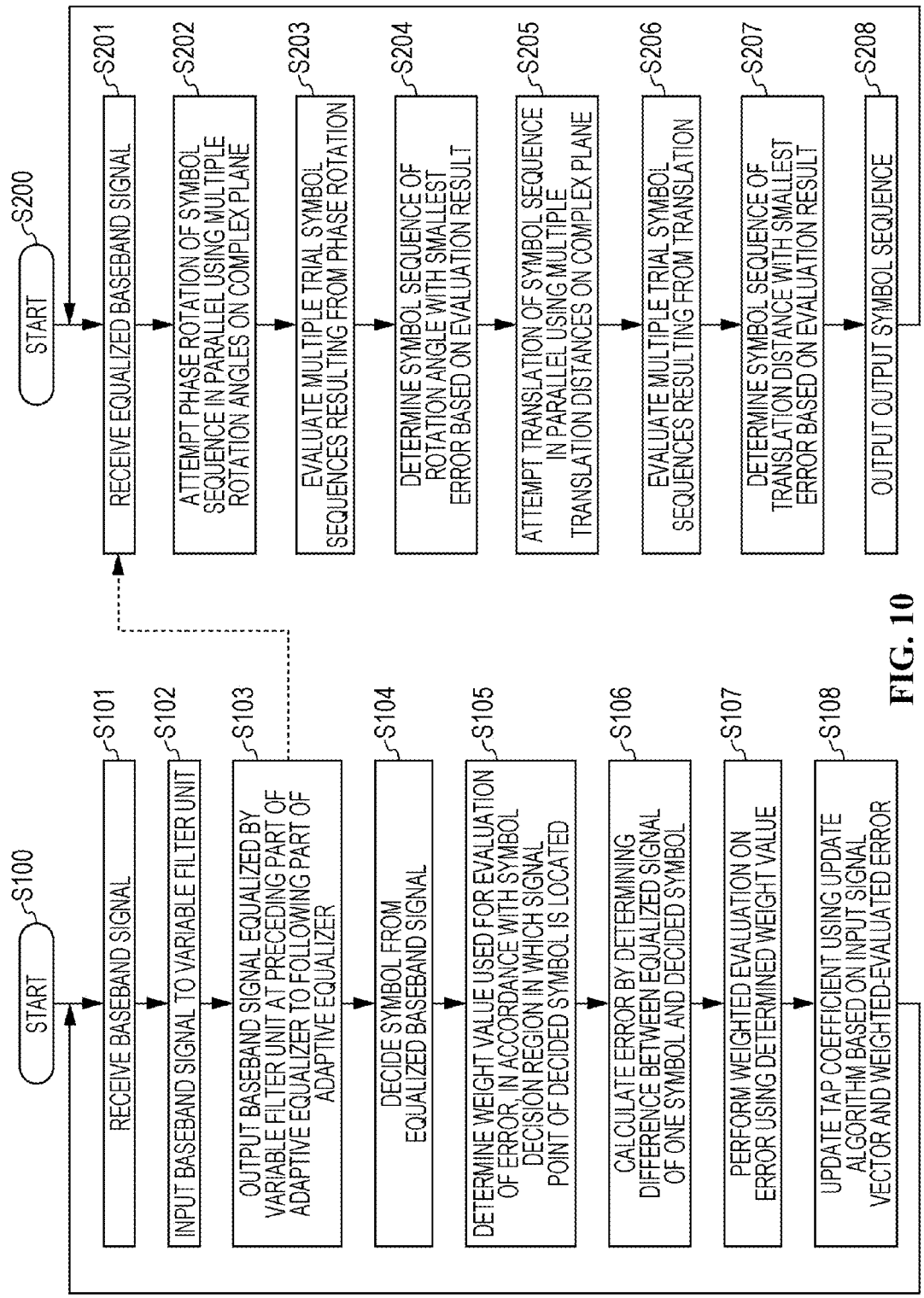
FIG. 10 is a flowchart illustrating the overview of the flow of a compensation process performed during a reception process executed by the wireless communication apparatus according to embodiments of the present disclosure.

An embodiment of a communication method executed by the wireless communication apparatus 110 will be described below with reference to FIG. 10. FIG. 10 is a flowchart illustrating the overview of the flow of a compensation process included in a reception process executed by the wireless communication apparatus 110 according to this embodiment. In FIG. 10, the flow illustrated on the left corresponds to a process that can be executed at the adaptive equalizer 200 side, and the flow illustrated on the right corresponds to a process that can be executed at the compensator 290 side.

The process at the adaptive equalizer 200 side illustrated in FIG. 10 starts from step S100. In some embodiments, at step S101, a baseband signal is received by, for example, the adaptive equalizer 200 of the wireless communication apparatus via the ADCs 124. In step S102, a wireless communication apparatus 110 inputs the received baseband signal to the variable filter unit 202 at the preceding part in the adaptive equalizer 200.

In step S103, the wireless communication apparatus 110 can output the baseband signal that has been equalized by the variable filter unit 202 to the subsequent part in the adaptive equalizer 200. The signal output at this time is output to the compensator 290 at the subsequent stage typically in units of symbols. In step S104, the symbol decision unit 204 of the wireless communication apparatus 110 decides a symbol from the baseband signal that has been equalized by the variable filter unit 202.

In step S105, the weighting unit 216 of the wireless communication apparatus 110 can determine a weight value used for error evaluation, in accordance with a symbol decision region in which a signal point of the decided symbol is located. For example, a table in which weight values are associated with respective symbol decision regions is prepared in advance, and a weight value is obtained from the table using the decided symbol decision region as a key. In step S106, a subtractor 218 of the wireless communication apparatus 110 calculates an error vector from a difference between the signal point of one equalized symbol and an ideal signal point of the decided symbol. In step S107, the multiplier 220 of the wireless communication apparatus 110 multiples the error vector by the determined weight value so as to perform weighted evaluation of the error.

In step S108, the tap coefficient updating unit 208 of the wireless communication apparatus 110 updates tap coefficients on the basis of the input signal vector including values from the respective delay lines as its elements and weighted-evaluated error vector in accordance with an update algorithm. The process can then return to step S201. Typically, steps S100 to S108 illustrated on the left side of FIG. 10 are repeatedly performed for each baseband signal corresponding to one symbol.

In some embodiments, the process executed by the compensator 290 illustrated on the right side of FIG. 10 starts at step S200. In step S201, the phase compensator 230 of the wireless communication apparatus 110 can receive a baseband signal output from the adaptive equalizer 200 in step S103. In step S202, the plurality of phase rotation devices 232 included in the phase compensator 230 of the wireless communication apparatus 110 attempt phase rotation of the symbol sequence on the complex plane using a plurality of rotation angles in parallel.

In step S203, the plurality of error evaluation units 234 of the wireless communication apparatus 110 evaluate the plurality of trial symbol sequences resulting from phase rotation. In step S204, the comparison/selection unit 236 of the wireless communication apparatus 110 determines a symbol sequence of a rotation angle with the smallest error on the basis of the evaluation results obtained by the error evaluation units 234. The signal of the symbol sequence determined here can be input to the DC offset compensator 260.

In step S205, the plurality of translation devices 262 of the DC offset compensator 260 of the wireless communication apparatus 110 attempt translation of the symbol sequence on the complex plane using a plurality of translation distances in parallel. In step S206, the plurality of error evaluation units 264 of the wireless communication apparatus 110 can evaluate a plurality of trial symbol sequences resulting from translation. In step S207, the comparison/selection unit 266 of the wireless communication apparatus 110 decides a signal of a symbol sequence of a translation distance with the smallest error on the basis of the evaluation results obtained by the error evaluation units 264.

In step S208, the signal of the symbol sequence determined in step S207 is output to the subsequent stage of the DC offset compensator 260. Thereafter, symbol decision is performed based on the compensated baseband signal, and data is restored. The process of steps S200 to S208 illustrated on the right side of FIG. 10 can be repeatedly performed in accordance with output of d symbols from the adaptive equalizer 200. Alternatively, in another embodiment, the process can be repeatedly performed using a signal of d preceding and subsequent symbols for each symbol output from the adaptive equalizer 200.

Consistent with experimental examples, the compensation circuit illustrated in FIGS. 3, 4, 8, and 9 was mounted on an FPGA (Field Programmable Gate Array) provided by Xilinx Inc. so as to implement a millimeter-wave wireless communication apparatus. A 60-GHz electromagnetic wave was used as a carrier, and 16QAM was adopted as the modulation scheme. An LMS algorithm was used as the update logic, and weights illustrated in FIG. 5 were used as weights of the update logic. The phase compensator 230 was configured to have seven levels. The DC offset compensator 260 was configured to have three levels including an offset of 0 for each of the I-component and Q-component. Data of a bit sequence generated by a random number generator was mapped to the payload, and the data was transmitted from the transmitter to the receiver using the implemented millimeter-wave wireless communication apparatus. A baseband signal demodulated at the reception side was observed and a bit error rate (BER) at that time was determined. The preamble preceding the payload was used for training; however, the entire payload following the preamble was subjected to the decision-directed mode.

Figure 11:
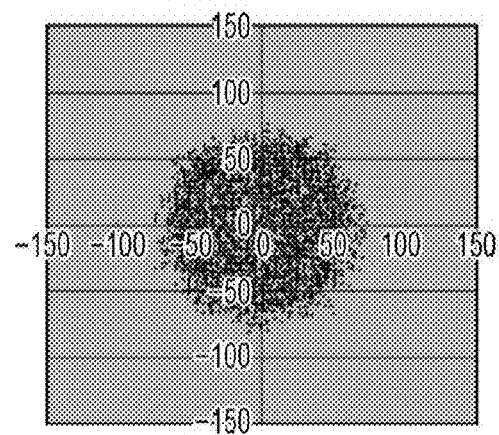
FIGS. 11(A), 11(B), and 11(C) are scatter diagrams in which signal points of individual samples of a reception baseband signal sampled in front of an adaptive equalizer, behind the adaptive equalizer, and behind the compensator, respectively, are plotted in the complex plane in the case of 16QAM, consistent with embodiments of the present disclosure.
Figure 11:
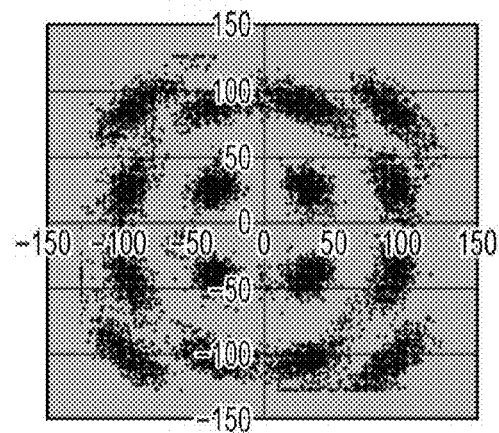
Figure 11:
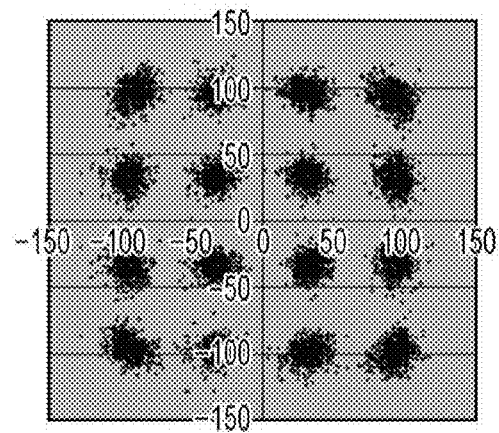

FIGS. 11(A) to 11(C) illustrate scatter diagrams in which signal points of individual samples of the reception baseband signal that were observed at respective stages in the case of 16QAM are plotted on the I-Q plane. FIG. 11(A) illustrates a distribution of signal points of the baseband signal before it was corrected by the adaptive equalizer 200. In contrast, FIG. 11(B) illustrates a distribution of signal points of the baseband signal that was transmitted without any training sequence and passed through the adaptive equalizer 200 in which weights illustrated in FIG. 5 were set. FIG. 11(C) illustrates a distribution of signal points of the baseband signal that further passed through the phase compensator 230 and the I-component and Q-component DC offset compensator 260.

As illustrated in FIG. 11(A), the distribution of signal points of the baseband signal before it passed through the adaptive equalizer 200 largely deviates from 16QAM signal constellation. In contrast, it was confirmed that, by causing the baseband signal to pass through the adaptive equalizer 200 in which weights illustrated in FIG. 5 were set, the distribution of signal points was corrected to be closer to 16QAM signal constellation than that of FIG. 11(A) without any training sequence in the payload although phase noise of fast components still remain as illustrated in FIG. 11(B). Further, it was confirmed that, by causing the baseband signal to pass through the phase rotation compensator 230 and the DC offset compensator 260, the distribution of signal points was corrected to be similar to 16QAM signal constellation further than that of FIG. 11(A) as illustrated in FIG. 11(C).

Figure 12:
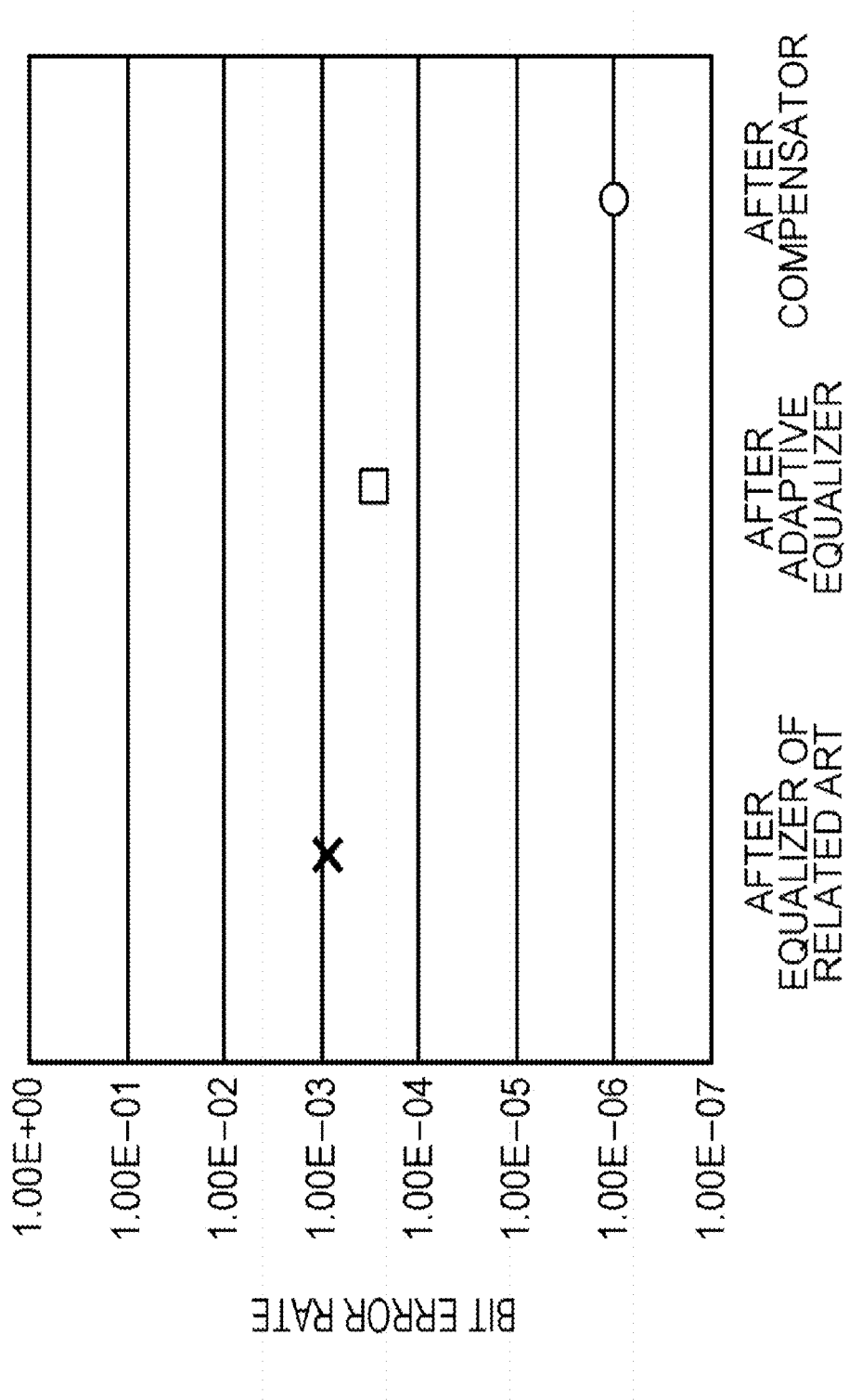
FIG. 12 is a graph in which BERs measured behind an equalizer of the related art, behind the adaptive equalizer according to the embodiment of the present disclosure, and behind the compensator are plotted, according to embodiments of the present disclosure.

FIG. 12 is a graph in which the BERs measured after an equalizer of the related art (x), after the adaptive equalizer 200 according to this embodiment instead of the equalizer of the related art (□), and after the compensator 290 (○) are plotted. As illustrated in FIG. 12, the BER obtained by performing symbol decision based on the baseband signal that has passed through the equalizer of the related art using the same weight was approximately 9E-4. In contrast, the BER obtained by performing symbol decision based on the baseband signal that has passed through the adaptive equalizer 200 decreased to 3E-4 and it was confirmed that the BER improved. Further, the BER obtained by performing symbol decision based on the baseband signal that has passed through the compensator 290 decreased further to 1E-6 and it was confirmed that the BER improved by approximately triple digits. Also, the data rate of the millimeter-wave wireless communication apparatuses each including the compensation circuit mounted therein was 6 Gbps.

As described above, some embodiments can provide a transmission apparatus, a reception apparatus, a communication system, a circuit device, a communication method, and a program product capable of preferably compensating for phase noise included in a reception signal and reducing a known pattern that is inserted to the payload and causes the overhead in high-speed communication.

In the wireless communication system according to the above-described embodiment, the error used to update parameters is subjected to weighted-evaluation in the update logic of the adaptive equalizer that equalizes the baseband signal at the reception side, in accordance with the position of the signal point of the symbol on the constellation diagram. The likelihood of erroneous decision due to phase noise differs depending on the symbol decision region corresponding to the position of the signal point of the symbol on the constellation diagram; however, this configuration enables feedback with a less amount of error in terms of phase rotation due to phase noise.

In particular, consistent with embodiments, weights are set such that a relatively reliable error determined in a symbol decision region in which erroneous decision is relatively less likely to occur is evaluated with a large weight and a relatively less reliable error determined in a symbol decision region in which erroneous decision is relatively more likely to occur is evaluated with a small weight. For this reason, the error evaluation function no longer indicates a local minimum at an incorrect position, and convergence of the correction parameter to an incorrect point can be prevented.

In a wireless communication system according to a more preferable embodiment, the compensator is provided outside the update loop of the adaptive equalizer, and a processing delay of the compensator is separated from a feedback delay of the adaptive equalizer. Because the feedback delay of the adaptive equalizer does not include the delay time of the compensator, phase-noise-compensation response performance of the adaptive equalizer is improved. The high-frequency phase noise that is not sufficiently followed by the adaptive equalizer, which is responsible for relatively-slow phase noise components, and the DC offset that depends on data are appropriately followed and compensated for by the compensator at the subsequent stage, and thus the data error rate can be improved.

Also, according to embodiments, the compensation circuit, convergence of the correction parameter is more easily achieved by the update logic based on weighted evaluation of the error. For this reason, the training sequence included in the payload of a frame to be transmitted and received can be reduced, and thus the overhead due to insertion of a known pattern is reduced. Further, the phase noise of fast components and the DC offset are preferably compensated for by the compensator. For this reason, the necessity of the training sequence included in the payload of a frame to be transmitted and received can be eliminated preferably. Further, the phase can be sufficiently compensated for by a digital circuit, a load of the RF unit can be reduced, the required precision of the local oscillator of the RF unit is loosened, and thus the cost can be reduced, consistent with embodiments.

A description has been given of the adaptive equalizer 200, the phase compensator 230, and the DC offset compensator 260 that are connected in series in the embodiment above; however, in the case where slow phase noise is dominant on communication channel characteristics, embodiments may be adopted in which the adaptive equalizer that weights the error vector alone is used. Also, in the described embodiment, the phase compensator 230 and the DC offset compensator 260 are connected in series so that the phase compensator 230 performs processing first and the DC offset compensator 260 performs processing next; however, the phase compensator 230 and the DC offset compensator 260 may be connected in the opposite order in the case where the amount of phase noise is small or the like. Further, in the above-described embodiment, the phase compensator 230 and the DC offset compensator 260 (further for the I-component and the Q-component) are configured as separate compensators; however, in some embodiments, combinations of phase rotation and translation may be simultaneously calculated, and as many sets of the phase compensator 230 and the DC offset compensator 260 as the combinations may be arranged in parallel, and evaluation functions may be calculated for individual trial symbol sequences, and a sequence with the smallest error may be selected.

Consistent with embodiments, wireless communication using millimeter waves has been described by way of example; however, the present disclosure is generally applicable to high-speed communication, such as optical wired communication, that employs the single-carrier transmission scheme and the coherent detection scheme.

Some or all of the above-described functional units can be implemented in a programmable device (PD), e.g., a field programmable gate array (FPGA) or an application-specific integrated circuit (ASIC); and can be distributed using a recording medium as circuitry data (bit stream data) to be downloaded to the PD in order to implement the functional units in the PD and data written in HDL (Hardware Description Language), VHDL (Very High Speed Integrated Circuits Hardware Description Language), Verilog-HDL, or the like for generating the circuitry data.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A reception apparatus comprising:
   a filter unit configured to create a filtered signal by correcting a reception signal that carries a symbol sequence;
   a decision unit configured to decide a symbol based on the filtered signal;
   a weighting unit configured to weight an error evaluation in accordance with a position of a signal point of the symbol decided by the decision unit;
   an updating unit configured to update a correction parameter of the filter unit based on the reception signal and the error evaluation weighted by the weighting unit; and
   a compensator provided outside an update loop including the filter unit, the decision unit, the weighting unit, and the updating unit, the compensator being configured to perform, using a plurality of complex compensation parameters in parallel, a geometric operation on the filtered signal, and configured to select an output symbol sequence from a plurality of resulting trial symbol sequences based on a particular error evaluation.

2. The reception apparatus according to claim 1, wherein the weighting unit is further configured to weight the error evaluation by setting a weight value corresponding to a margin of error regarding phase rotation, for each symbol decision region in a constellation diagram.

3. The reception apparatus according to claim 1, wherein the compensator includes a phase compensator including a phase rotation device configured to apply phase rotation on the filtered signal, using a plurality of complex rotation angles in parallel.

4. The reception apparatus according to claim 3, wherein the compensator includes a direct-current offset compensator including:
   a translation device configured to apply translation to a phase rotated filtered signal, using a plurality of complex translation distances in parallel.

5. The reception apparatus according to claim 4, wherein the compensator further includes:
   an evaluation unit configured to evaluate individual results of translations applied by the translation device based on the complex rotation angles, the complex translation distances, or combinations of the complex rotation angles and the complex translation distances; and
   a selection comparison unit configured to select a complex rotation angle, a complex translation distance, or a combination of a complex rotation angle and a complex translation distance that minimizes an error, based on an evaluation of the individual results obtained by the evaluation unit.

6. The reception apparatus according to claim 5, wherein the evaluation unit is configured to calculate, using a plurality of symbols, an error vector amplitude, an average of error vector amplitudes, an average of sums of absolute values of in-phase components and quadrature components of error vectors, an average of phase errors, an average of sums of absolute values of phase errors and amplitude errors, or a combination thereof.

7. The reception apparatus according to claim 2, wherein the weighting unit is further configured to set a weight value of each symbol decision region such that an evaluation function that evaluates an average error using a phase rotation angle from a correct position of signal constellation as a variable has a sole local minimum at the correct position within a range of 360/n degrees that is centered at the correct position, where n denotes an order of rotational symmetry of the signal constellation.

8. A communication system comprising a transmission apparatus and a reception apparatus, the reception apparatus comprising:
   a reception unit configured to receive a reception signal that carries a symbol sequence from the transmission apparatus;
   a filter unit configured to create a filtered signal by correcting the reception signal;
   a decision unit configured to decide a symbol based on the filtered signal;

a weighting unit configured to weight an error evaluation in accordance with a position of a signal point of the symbol decided by the decision unit;

an updating unit configured to update a correction parameter of the filter unit, based on the reception signal and the error evaluation weighted by the weighting unit; and a compensator provided outside an update loop including the filter unit, the decision unit, the weighting unit, and the updating unit, the compensator being configured to apply, using a plurality of complex compensation parameters in parallel, a geometric operation on the filtered signal, and configured to select an output symbol sequence from a plurality of resulting trial symbol sequences based on a particular error evaluation.

9. The communication system according to claim 8, wherein the transmission apparatus is configured to transmit a frame in which an unknown symbol sequence occupies at least a payload of the frame.

10. A circuit device comprising:

an input unit configured to receive a reception signal carrying a symbol sequence;

a filter unit configured to create a filtered signal by correcting the reception signal;

a decision unit configured to decide a symbol based on the filtered signal;

a weighting unit configured to weight an error evaluation in accordance with a position of a signal point of the symbol decided by the decision unit;

an updating unit configured to update a correction parameter of the filter unit, based on the reception signal and the error evaluation weighted by the weighting unit; and an output unit configured to output a symbol sequence decided based on the filtered signal; and a compensator outside an update loop including the filter unit, the decision unit, the weighting unit, and the updating unit, the compensator being configured to apply, using a plurality of complex compensation parameters in parallel, a geometric operation on the filtered signal, and configured to select an output symbol sequence from a plurality of resulting trial symbol sequences based on a particular error evaluation, wherein the output unit outputs the output symbol sequence selected.

\* \* \* \* \*